United States Patent
Robello et al.

(10) Patent No.: US 9,523,011 B2
(45) Date of Patent: Dec. 20, 2016

(54) RECIRCULATING INKJET PRINTING FLUID

(71) Applicants: Douglas Robert Robello, Webster, NY (US); Mark R. Mis, Rush, NY (US); Grace Ann Bennett, Scottsville, NY (US)

(72) Inventors: Douglas Robert Robello, Webster, NY (US); Mark R. Mis, Rush, NY (US); Grace Ann Bennett, Scottsville, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 71 days.

(21) Appl. No.: 14/311,763

(22) Filed: Jun. 23, 2014

(65) Prior Publication Data
US 2015/0368488 A1 Dec. 24, 2015

(51) Int. Cl.
| | |
|---|---|
| *B41J 2/18* | (2006.01) |
| *C09D 11/30* | (2014.01) |
| *C09D 11/107* | (2014.01) |
| *B41J 2/21* | (2006.01) |
| *C09D 11/102* | (2014.01) |
| *C09D 11/322* | (2014.01) |

(52) U.S. Cl.
CPC .......... *C09D 11/30* (2013.01); *B41J 2/18* (2013.01); *B41J 2/2107* (2013.01); *C09D 11/102* (2013.01); *C09D 11/107* (2013.01); *C09D 11/322* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC .................................................. 347/95–105
See application file for complete search history.

(56) References Cited

U.S. PATENT DOCUMENTS

| | | | |
|---|---|---|---|
| 4,614,948 A | 9/1986 | Katerberg et al. | |
| 4,734,711 A | 3/1988 | Piatt et al. | |
| 4,971,527 A | 11/1990 | Dick | |
| 5,394,177 A | 2/1995 | McCann et al. | |
| 5,891,950 A * | 4/1999 | Collins | C09D 11/106 524/502 |
| 6,057,384 A | 5/2000 | Nguyen et al. | |
| 6,588,888 B2 | 7/2003 | Jeanmaire et al. | |
| 6,943,037 B2 | 9/2005 | Anagnostopoulos et al. | |
| 7,696,262 B2 | 4/2010 | Cagle et al. | |
| 8,314,163 B2 | 11/2012 | Ganapathiappan | |

(Continued)

FOREIGN PATENT DOCUMENTS

| | | |
|---|---|---|
| EP | 1013450 | 6/2000 |
| EP | 1 403 342 A1 | 3/2004 |

(Continued)

*Primary Examiner* — Manish S Shah
(74) *Attorney, Agent, or Firm* — Raymond L. Owens; J. Lanny Tucker

(57) ABSTRACT

An inkjet printing fluid for printing systems employing recirculating printing fluids is described. The printing fluid including water, colorants, and an acrylic latex polymer that includes repeating units of alkylene oxide groups.

16 Claims, 1 Drawing Sheet

(56) References Cited

U.S. PATENT DOCUMENTS

| | | | |
|---|---|---|---|
| 2005/0176847 A1 | 8/2005 | Cagle | |
| 2006/0264534 A1* | 11/2006 | Ma | C09D 11/38 523/160 |
| 2008/0186373 A1 | 8/2008 | Rolly | |
| 2011/0097497 A1* | 4/2011 | Ganapathiappan | C09D 11/30 427/256 |
| 2012/0277366 A1* | 11/2012 | Mis | C08G 18/4854 524/507 |

FOREIGN PATENT DOCUMENTS

| | | |
|---|---|---|
| WO | 2009/070147 A1 | 6/2009 |
| WO | 2012/149324 A1 | 11/2012 |

* cited by examiner

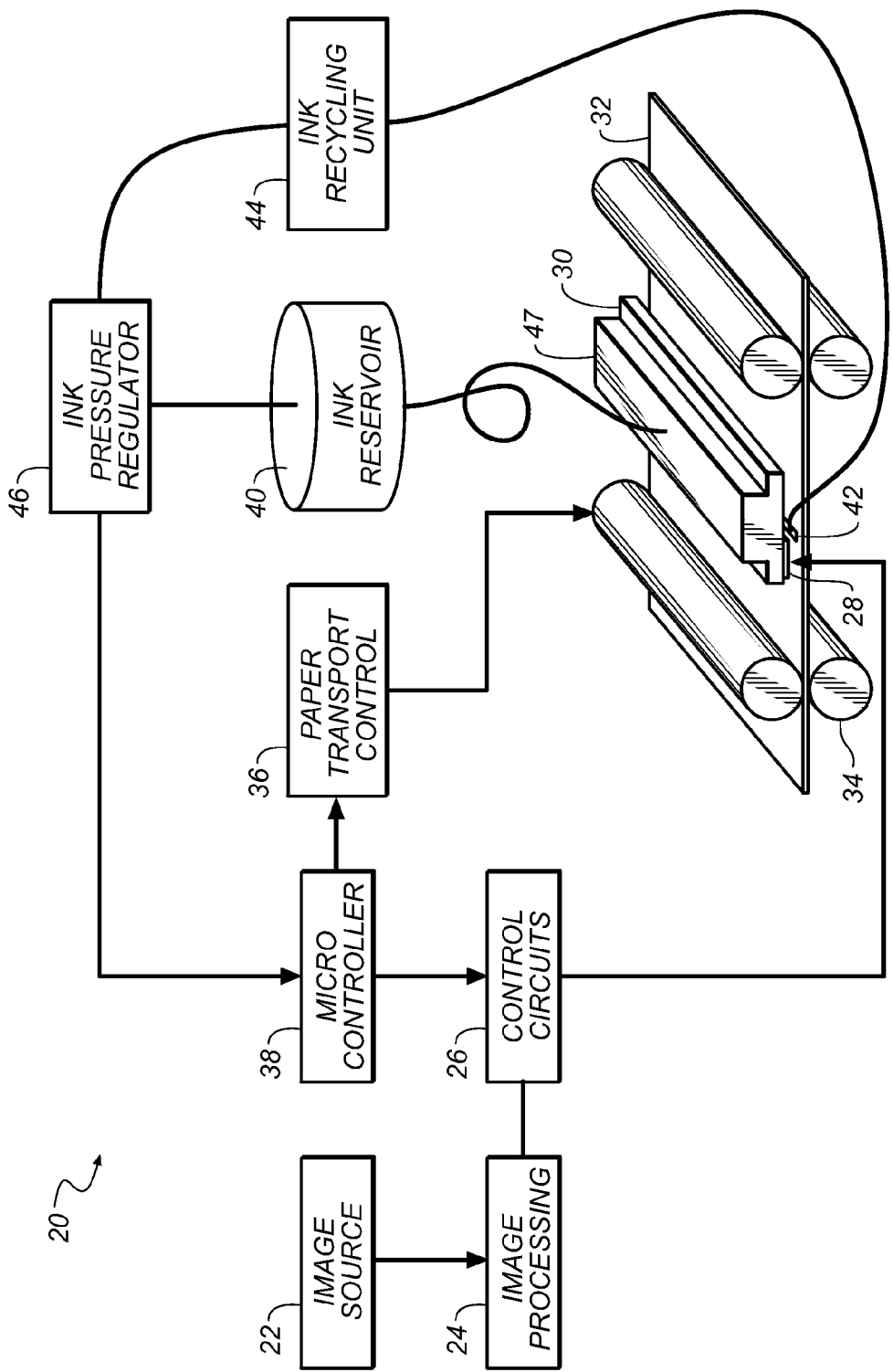

RECIRCULATING INKJET PRINTING FLUID

FIELD OF THE INVENTION

The present invention relates generally to the field of inkjet printing fluids, and in particular to inks which are useful for printing systems employing recirculating printing fluids such as continuous inkjet printing systems. More specifically, the present invention relates to specially formulated inks for continuous inkjet printing systems which result in high density printed images without printer fluid demobilization and filter plugging during recirculation.

BACKGROUND OF THE INVENTION

Inkjet printing is a non-impact method for producing printed images by the deposition of ink droplets in a pixel-by-pixel manner to an image-recording element in response to digital signals. There are various methods that can be used to control the deposition of ink droplets on the image-recording element to yield the desired printed image. In one process, known as drop-on-demand inkjet, individual droplets are projected as needed onto the image-recording element to form the desired printed image. Common methods of controlling the ejection of ink droplets in drop-on-demand (DOD) printing include thermal bubble formation (thermal inkjet (TIJ)) and piezoelectric transducers. In another process known as continuous inkjet (CIJ), a continuous stream of droplets is generated and expelled in an image-wise manner onto the surface of the image-recording element, while non-imaged droplets are deflected, caught, and recycled to an ink sump. Inkjet printers have found broad applications across markets ranging from desk top document and photographic-quality imaging, to commercial printing and industrial labeling.

Continuous inkjet (CIJ) printers typically include two main components, a fluid system and one or more print heads Ink is delivered through a supply line from a supply reservoir to a manifold that distributes the ink to a plurality of orifices, typically arranged in linear array(s), under sufficient pressure to cause ink streams to issue from the orifices of the print head. Stimulations are applied to the print head to cause those ink streams to form streams of spaced droplets, which are deflected into printing or non-printing paths. The non-printing droplets are recirculated by being returned to the supply reservoir via a droplet catcher and a return line. U.S. Pat. Nos. 4,734,711 and 5,394,177 and EP 1,013,450 describe in detail the design of a fluid system for CIJ apparatus. The more recent development of CIJ printing apparatus and print head fabrication can be found in U.S. Pat. Nos. 6,588,888 and 6,943,037. Ink drop uniformity in CIJ printers requires maintaining a uniform pressure in the print head cavity. U.S. Pat. No. 4,614,948 describes that a positive displacement pump, such as gear pump, is preferred for use as the ink supply pump. The need to limit pulsation produced by the pump is recognized in U.S. Pat. No. 4,971,527. In addition, filters are employed at appropriate locations in fluid system to remove oversized particles prior to ink entering into print head orifices and avoid print head clogging.

Ink compositions containing colorants used in inkjet printers can be classified as either pigment-based, in which the colorants exists as pigment particles suspended in the ink composition, or as dye-based, in which the colorants exists as a fully solvate dye species that includes one or more dye molecules. In such traditional dye-based inks, no colorants particles are observable under the microscope. CIJ inks traditionally have been mostly aqueous dye-based inks, where issues regarding robust system operation, such as easy start up/shut down, extended printing time without crooked jet, and reduced frequency for filter changing have been minimized. Although there have been many recent advances in the art of dye-based inkjet inks, such inks still suffer from deficiencies such as low optical densities on coated glossy paper and poor light-fastness. When water is used as the carrier, such inks also generally suffer from poor water fastness and poor smear resistance.

Pigments are highly desirable for use in inkjet inks since they are far more resistant to fading than dyes. However, pigment-based inks have a number of potential drawbacks. Great lengths are undertaken to reduce a pigment particle to a sufficiently small particle size and to provide sufficient colloidal stability to the particles. Pigment-based inks often require a lengthy milling operation to produce particles in the sub-micron range needed for most modern ink applications. If the pigment particles are too large, light scattering can have a detrimental effect on optical density and gloss in the printed image, and filter plugging issues can also be encountered when running pigment inks in a CIJ or other recirculating fluid printing system, requiring frequent change of filters, e.g., over the time period of a few hours vs. Ha few months for dye-based inks The consequence of filter plugging is the loss of fluid pressure and fluid jets, leading to system shutdown. Further investigation has discovered that the gear pump commonly used in the CIJ fluid system to maintain fluid pressure with minimal pulsation can cause demobilization and agglomeration of pigment or other particle dispersions in an ink, leading to filter clogging and system shutdown. Such demobilization and filter plugging can also be a problem with other printing systems employing recirculating printing fluids, such as where a recirculation system is used to recirculate printing fluid continuously through a drop on demand print head, or to an ink tank associated with such a print head.

A further potential drawback of pigmented inks is their durability after printing, especially under conditions where abrasive forces have been applied to the printed image. Pigment-based inks typically reside at the surface of the imaging receiver to which they are printed and this makes the printed images particularly susceptible to abrasive forces. To this extent, pigmented inks have been formulated with various polymers, dispersants, and other addenda to provide durable images that can withstand post printing physical abuse and environmental conditions. Pigmented inks for inkjet printing have been formulated with acrylic polymers, e.g., typically in the form of water soluble polymers. Alternatively, acrylic latex polymers can be employed, such as described in, e.g., U.S. Patent Application Publication Nos. 2005/0176847 and 2008/0186373, and U.S. Pat. No. 7,696,262. Steric stabilized latex particulates for use in inkjet inks are also described in U.S. Pat. No. 8,314,163. Water-soluble acrylic polymers, however, alone are typically insufficient in providing durable high density images, and can increase an ink's viscosity to higher levels than desired, especially for recirculating ink printing systems. Latex particulate polymers, on the other hand, can contribute to undesired filter plugging in recirculating fluid printing systems. An inkjet printing fluid composition containing an acrylic latex and a water dispersible polyurethane additive that enables the fluid to be recirculated for extended periods in described in U.S. Patent Application Publication No. 2012/0277366.

SUMMARY OF THE INVENTION

The present invention provides inkjet printing fluid compositions, including pigment-based inks, containing an acrylic latex polymer with a specified number of polyethylene oxide groups that provides improved optical density in a printed image. It is a further object of this invention to provide such printing fluids for CIJ printing systems which enable the ink to be recirculated in a CIJ fluid system for extended periods without significant pressure build up or filter clogging.

In accordance with one embodiment, there is provided an inkjet printing fluid composition for printing systems employing recirculating printing fluids comprising water, colorants, and an acrylic latex polymer that includes repeating units of alkylene oxide groups.

The present invention provides inkjet printing fluid compositions, such as pigment-based inkjet printing inks, which contain an acrylic latex polymer which provides increased optical density for printed images that enables the latex-containing printing fluid to be recirculated for extended periods in a recirculating printing fluid printing system without significant fluid demobilization or pressure build up or filter clogging.

BRIEF DESCRIPTION OF THE DRAWINGS

In the detailed description of the example embodiments of the present invention presented below, reference is made to the accompanying drawing, in which:

FIG. 1 shows a schematic of a continuous inkjet printing system that can be employed in accordance with an embodiment of the present invention.

DETAILED DESCRIPTION OF THE INVENTION

Recirculating printing fluid printing systems useful for applying a printing fluid in accordance with the present invention to a substrate include a printing fluid applicator and a recirculating printing fluid supply supplying the printing fluid to the applicator. Printing fluid applicators include, e.g., conventional inkjet print heads and fluid spray devices. In a particular embodiment, printing fluids of the present invention are designed for printing with a continuous inkjet printer. In such CIJ printers, a continuous stream of droplets is generated, a portion of which are deflected in an imagewise manner onto the surface of the image-recording element, while un-imaged droplets are caught and returned to an ink sump. In the system of continuous inkjet printing a main fluid supply is provided with the printing fluid composition, which is then delivered from the main fluid supply to a print head, where a continuous stream of the ink composition is ejected from the print head, which continuous stream then is broken into spaced droplets. In response to electrical signals received from a control mechanism, the droplets are then selected between printing droplets for marking a substrate and nonprinting droplets that are collected and returned to the main fluid supply. Continuous inkjet systems which can be used in accordance with specific embodiments of the present invention include those disclosed in U.S. Pat. Nos. 6,588,888, 6,554,410, 6,682,182, 6,575,566, 6,793,328, 6,866,370, 6,517,197 and U.S. Patent Application Publication No. 2003/0202054, the disclosures of which are herein incorporated in their entirety by reference. In another embodiment, an apparatus capable of controlling the direction of the formed printing and nonprinting drops by asymmetric application of heat to the fluid stream that initializes drop break-up and serves to steer the resultant drop can be employed, as disclosed in U.S. Pat. Nos. 6,079,821 and 6,505,921, the disclosures of which are herein incorporated in their entirety by reference. Useful ink agitation, heated ink supply and print head and fluid filtration systems for CIJ pigmented inkjet ink compositions are described in U.S. Pat. No. 6,817,705, the disclosure of which is herein incorporated in its entirety by reference. Printer replenishing systems for maintaining ink quality and countering the effects of ink volatile component evaporation are described in U.S. Pat. Nos. 5,526,026 and 5,473,350 and EP 0 597 628 A1, the disclosures of which are herein incorporated in their entirety by reference.

Referring to FIG. 1, a continuous printing system 20 includes an image source 22 such as a scanner or computer which provides raster image data, outline image data in the form of a page description language, or other forms of digital image data. This image data is converted to half-toned bitmap image data by an image processing unit 24 which also stores the image data in memory. A plurality of drop forming mechanism control circuits 26 read data from the image memory and apply time-varying electrical pulses to a drop forming mechanism(s) 28 that are associated with one or more nozzles of a print head 30. These pulses are applied at an appropriate time, and to the appropriate nozzle, so that drops formed from a continuous inkjet stream will form spots on a recording medium 32 in the appropriate position designated by the data in the image memory. Recording medium 32 is moved relative to print head 30 by a recording medium transport system 34, which is electronically controlled by a recording medium transport control system 36, and which in turn is controlled by a microcontroller 38. The recording medium transport system 34 shown in FIG. 1 is a schematic only, and many different mechanical configurations are possible. For example, a transfer roller could be used as recording medium transport system 34 to facilitate transfer of the ink drops to recording medium 32. Such transfer roller technology is well known in the art. In the case of page width print heads, it is most convenient to move recording medium 32 past a stationary print head 30. However, in the case of scanning print systems, it is usually most convenient to move the print head 30 along one axis (the sub-scanning direction) and the recording medium 32 along an orthogonal axis (the main scanning direction) in a relative raster motion.

Ink is contained in an ink reservoir 40 under pressure. In the non-printing state, continuous inkjet drop streams are unable to reach recording medium 32 due to an ink catcher 42 that blocks the stream and which can permit a portion of the ink to be recycled by an ink recycling unit 44. The ink recycling unit 44 reconditions the ink and delivers it back to ink reservoir 40. Such ink recycling units 44 are well known in the art. The ink pressure suitable for optimal operation will depend on a number of factors, including geometry and thermal properties of the nozzles and thermal properties of the ink. A constant ink pressure can be achieved by applying pressure to ink reservoir 40 under the control of ink pressure regulator 46. Alternatively, the ink reservoir 40 can be left unpressurized, or even under a reduced pressure (vacuum), and a pump is employed to deliver ink from the ink reservoir 40 under pressure to the print head 30. In such an embodiment, the ink pressure regulator 46 can include an ink pump control system. As shown in FIG. 1, ink catcher 42 is a type of catcher commonly referred to as a "knife edge" catcher. The ink is distributed to printhead 30 through an ink channel 47. The ink preferably flows through slots or holes etched through a silicon substrate of print head 30 to its front surface, where a plurality of nozzles and drop forming mechanisms, for example, heaters, are situated. When print head 30 is fabricated from silicon, drop forming mechanism control circuits 26 can be integrated with the print head 30. Print head 30 also includes an ink drop deflection mechanism (not shown), such as described in the above referenced patents.

In an alternative embodiment, inkjet printing fluids of the present invention can be designed for use in an independently operated printing fluid applicator (such as a drop-on-demand print head), which can be employed with a separate recirculating printing fluid supply which delivers the printing fluid from a main fluid supply to the print head 30, or an ink tank associated with the print head 30, and recirculates non-printed printing fluid (i.e., printing fluid which has not been ejected through printing jets of the print head 30) back to the main fluid supply. Such alternative system can be applicable when it is desired to maintain a relatively large ink supply for a drop-on-demand system, or where it is otherwise desired to maintain the printing fluid supply in a state of agitation by recirculation. In drop-on-demand inkjet, individual ink droplets are projected as needed onto the image-recording element to form the desired printed image. Common methods of controlling the projection of ink droplets in drop-on-demand printing include piezoelectric transducers, thermal bubble formation (thermal inkjet), or an actuator that is made to move. Exemplary thermal drop-on-demand print heads are described in U.S. Pat. No. 7,350,902. Drop on demand printers typically include one or more ink tanks that supply ink to the print head, and a source of image data that provides signals that are interpreted by a controller as being commands to eject drops of a selected ink from the print head 30. Print heads 30 can be integral with the ink tanks, or separate. A separate recirculating printing fluid supply can be employed to deliver printing fluid from a main fluid supply to the print head 30, or to an ink tank associated with the print head 30, and continuously recirculate non-printed printing fluid (i.e., printing fluid which has not been ejected through printing jets of the print head 30) back to the main fluid supply.

In contrast to drop-on-demand printing, CIJ is a very high speed printing process, and it is desired to operate at substrate transport speeds in excess of 100 m/min. Printing speed alone imposes some limitations on ink formulation relative to slower drop-on-demand printing techniques, simply on the basis of the short time requirements for adequately drying the printed substrate moving at full speed in the press before roll wind-up. Unexpectedly, features of CIJ print head operation can permit wider ink formulation latitude than is possible in DOD printing in other respects. Ink formulation considerations specific to traditional CIJ printing are described in W. Wnek, *IEEE Trans.* 1986, 1475-81, which elucidates the ink performance requirements for drop formation, deflection and catching of non-printing drops, recirculation of the ink to the print head from the storage reservoir for future printing, and also for commercial ink-media image quality and durability. In order to achieve improved dispersion stability in inkjet printing systems employing an acrylic latex-containing printing fluid and a recirculating fluid supply, such as in continuous inkjet systems, use of acrylic latex polymers including at least one weight percent non-ionic, non-acidic monomer, such as polyethylene glycol, are employed.

The inkjet printing fluids of the present invention are aqueous-based printing fluids. "Aqueous-based" is defined herein to mean the printing fluid includes mainly water as the carrier medium for the remaining printing fluid components. In a preferred embodiment, the printing fluids of the present invention includes at least about 50 weight percent water. In a specific embodiment, the printing fluid is a pigment-based ink. Pigment-based inks are defined as inks containing at least a dispersion of water-insoluble pigment particles.

An ink set is defined as a set of two or more inks An ink set can contain pigment-based inks of different colors, for example, cyan, magenta, yellow, red, green, blue, orange, violet, or black. In one embodiment, a carbon black pigmented ink is used in an ink set including at least three inks having separately, a cyan, a magenta, and a yellow colorants. Useful ink sets also include, in addition to the cyan, magenta, and yellow inks, complimentary colorants such as red, blue, violet, orange, or green inks In addition, the ink set can include light and dark colored inks, for example, light cyan and light magenta inks commonly used in the ink sets of wide format printers. It is possible to include one or more inks that have a mixture of different colored pigments in the ink set. An example of this is a carbon black pigment mixed with one or more colored pigments or a combination of different colored pigments. An ink set can also include one or more pigment-based inks in combination with one or more clear inks An ink set can also include at least one or more pigment-based inks in combination with additional inks that are dye-based ink. An ink set can further include one or more inks containing a self-dispersing carbon black pigment ink which is used primarily for printing of text and a plurality of cyan, magenta, yellow, and black inks which are used primarily for photographic quality printing.

Printing fluid compositions of the present invention include an acrylic latex polymer, preferably at levels from 1 to 20% by weight based on the total printing fluid components, more preferably from 2 to 20% by weight and most preferably from 6 to 15% by weight. These ranges provide improved optical density and durability of printed images. The acrylic latex polymer is present in the printing fluid in the form of a latex, i.e., primarily in the form of dispersed polymer particles. The term "latex" or "latex dispersion" refers to both the latex polymer particles themselves as well as the aqueous medium in which the polymer particles are dispersed. More specifically, a latex is a liquid suspension including a liquid (such as water and/or other liquids) and polymeric particulates, typically ranging from about 20 nm to 500 nm in size, and having a weight average molecular weight from about 10,000 Mw to 2,000,000 Mw (preferably from about 40,000 Mw to 100,000 Mw). Such polymeric particulates can include a plurality of monomers that are typically randomly polymerized, and can also be crosslinked. When crosslinked, the molecular weight can be even higher than that cited above.

The terms "latex polymer" or "latex polymer particles" refer to the polymeric masses that are dispersed in a latex dispersion. The term "acidified latex particulates" refers to neutralized acid groups of latex particulates that can be present at the surface of latex particulates. The acid groups provide the colloidal latex particles with electrostatic stabilization to avoid particle to particle aggregation. Specifically, latex particulates having surface acid groups tend to be more stable over longer periods of time, and tend to resist aggregation. These acid groups can be present throughout the latex particulates, including on the surfaces, or can be more concentrated at the surfaces. In a more detailed aspect, the latex particulates can be prepared using acid monomers copolymerized with other monomers to form a monomer emulsion, which in turn, is initiated to form the latex particulates. The acid functionalities are neutralized to provide a surface charge on the latex particles. In this exemplary embodiment, the acid monomers can be present at from approximately 0.1 wt % to 15 wt % of total monomers used to form the latex particulates. Typical acids that have been used to acidify the surface of latex particulates included carboxylic acids, though stronger acids can also be used, such as sulfonic acids. Carboxylic acids are weak acids that have been fairly effective for use in latex/ink-jet ink systems. For example, methacrylic acid functionalized latex particulates can be formed using 5-10 wt % methacrylic acid. During preparation, a fraction of the methacrylic acid monomers can stay in the particle phase and the balance can migrate to the aqueous phase of the emulsion.

In another exemplary embodiment, the latex particulates employed in the present invention can be provided by multiple monomers copolymerized to form the latex particulates, wherein the multiple monomers include at least one crosslinking monomer present at from approximately 0.1 wt % to 10 wt % of total monomers used to form the latex particulates. Such a crosslinking monomer does not provide the acid groups but can provide other properties to the latex that can be desirable for inkjet applications.

Exemplary monomers that can be used to form latex particulates useful in the present invention include, but are in no way limited to, styrenes, C1 to C8 alkyl methacrylates, C1 to C8 alkyl acrylates, ethylene glycol methacrylates and dimethacrylates, methacrylic acids, acrylic acids, sulfonates, and the like. Non-limiting specific examples of the acrylic latex polymer further include polymer colloid particulates having surface acid groups further described in U.S. Patent Application Publication No. 2005/0176847, which is incorporated herein by reference in its entirety.

In a preferred embodiment of the present invention, the acrylic latex preferably includes less than 20 wt % of the acrylic latex polymer as free solution polymer, where "free solution polymer" is defined as that portion of the polymer in an aqueous dispersion which is visible in an $^1$H NMR spectrum of the aqueous dispersion, where the measured $^1$H integral is compared to the integral of the completely dissolved polymer. More preferably, the acrylic latex includes less than 10 wt % of the acrylic latex polymer as free solution polymer, and most preferably includes less than 4 wt % of the acrylic latex polymer as free solution polymer.

The acrylic latex polymer also includes repeating units of alkylene oxide groups formed from non-ionic, non-acidic hydrophilic monomers. Some suitable non-acidic hydrophilic monomers typically include non-ionic, non-acidic monomers selected from, for example, ethoxy triethyleneglycol methacrylate, (methoxy-ethoxy)ethyl acrylate, methoxy polyethylene glycol methacrylate, polyethylene glycol methacrylate, glycidyl methacrylate, glycidyl acrylate, hydroxyethyl methacrylate, hydroxypropyl methacrylate, hydroxyethyl acrylate, or hydroxypropyl acrylate. More typically, the hydrophilic, non-ionic, non-acidic monomer includes: ethoxy triethyleneglycol methacrylate, polyethylene glycol methacrylate, or hydroxyethyl methacrylate.

Unless otherwise specifically stated, use of the term "substituted" or "substituent" means any group or atom other than hydrogen. Additionally, when the term "group" is used, it means that when a substituent group contains a substitutable hydrogen, it is also intended to encompass not only the substituent's unsubstituted form, but also its form further substituted with any substituent group or groups as herein mentioned, so long as the substituent does not destroy properties necessary for device utility. Suitably, a substituent group can be halogen or can be bonded to the remainder of the molecule by an atom of carbon, silicon, oxygen, nitrogen, phosphorous, sulfur, selenium, or boron. The substituent can be, for example, halogen, such as chloro, bromo or fluoro; nitro; hydroxyl; cyano; carboxyl; or groups which can be further substituted, such as alkyl, including straight or branched chain or cyclic alkyl, such as methyl, trifluoromethyl, ethyl, t-butyl, 3-(2,4-di-t-pentylphenoxy)propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2, 4-di-t-pentylphenoxy)ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentyl-phenoxy)acetamido, alpha-(2, 4-di-t-pentylphenoxy)butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl)carbonylamino, p-dodecyl-phenylcarbonylamino, p-tolylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-tolylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-tolylsulfonamido, p-dodecylbenzenesulfonamido, N-methyltetradecylsulfonamido, N,N-dipropyl-sulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl, N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-tolylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-tolylsulfinyl; thio, such as ethylthio, octylthio, benzylthio, tetradecylthio, 2-(2,4-di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine, imino, such as 1(N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which can be substituted and which contain a 3 to 7 membered heterocyclic ring composed of carbon atoms and at least one hetero atom selected from the group consisting of oxygen, nitrogen, sulfur, phosphorous, and boron, such as 2-furyl, 2-thienyl, 2-benzimidazolyloxy or 2-benzothiazolyl; quaternary ammonium, such as triethylammonium; quaternary phosphonium, such as triphenylphosphonium; and silyloxy, such as trimethylsilyloxy.

If desired, the substituents can themselves be further substituted one or more times with the described substituent groups. The particular substituents used can be selected by those skilled in the art to attain desirable properties for a specific application and can include, for example, electron-withdrawing groups, electron-donating groups, and steric groups. When a molecule can have two or more substituents, the substituents can be joined together to form a ring such as a fused ring unless otherwise provided. Generally, the above groups and substituents thereof can include those having up to 48 carbon atoms, typically 1 to 36 carbon atoms and usually less than 24 carbon atoms, but greater numbers are possible depending on the particular substituents selected.

Pigment-based ink compositions employing non-self-dispersed pigments that are useful in pigmented printing fluids of the present invention can be prepared by any method known in the art of inkjet printing. Useful methods commonly involve two steps: (a) a dispersing or milling step to break up the pigments to desirable particle size, and (b) a dilution step in which the pigment dispersion from step (a) is diluted with the remaining printing fluid components to give a working strength ink. The milling step (a) is carried out using any type of grinding mill such as a media mill, a ball mill, a two-roll mill, a three-roll mill, a bead mill, an air-jet mill, an attritor, or a liquid interaction chamber. In the milling step (a), pigments are optionally suspended in a medium that is typically the same as or similar to the medium used to dilute the pigment dispersion in step (b). Inert milling media are optionally present in the milling step (a) in order to facilitate break up of the pigments to desired particle size. Inert milling media include such materials as polymeric beads, glasses, ceramics, metals and plastics as described, for example, in U.S. Pat. No. 5,891,231. Milling media are removed from either the pigment dispersion obtained in step (a) or from the ink composition obtained in step (b).

A dispersant is present in the milling step (a) in order to facilitate break up of the pigments. For the pigment dispersion obtained in step (a) or the ink composition obtained in step (b), a dispersant is present in order to maintain particle stability and prevent settling. The dispersant for the pigment particles can be a surfactant, such as for example, potassium oleylmethyl taurate (KOMT), sodium dodecyl sulfate or sodium dioctyl sulfosuccinate.

Polymeric dispersants can be used to disperse the pigment particles prior to, or during the milling step. Typically, these polymeric dispersants are copolymers made from hydrophobic and hydrophilic monomers. Examples of polymeric dispersants for pigment particles include random and block copolymers having hydrophilic and hydrophobic portions; see for example, U.S. Pat. Nos. 4,597,794, 5,085,698, 5,519,085, 5,272,201, 5,172,133, and 6,043,297, and PCT Patent Publication Number WO 2004/111140A1; and graft copolymers; see for example, U.S. Pat. Nos. 5,231,131, 6,087, 416, 5,719,204, and 5,714,538. Among these polymeric dispersants anionic polymeric dispersants are especially useful.

Polymeric dispersants useful for dispersing the pigment particles employed in the present invention are not limited in the arrangement of the monomers including the dispersant. The arrangement of monomers can be totally random, or they can be arranged in blocks such as AB or ABA wherein, A is the hydrophobic monomer and B is the hydrophilic monomer. In addition, the polymer can take the form of a random terpolymer or an ABC tri-block wherein, at least one of the A, B and C blocks is chosen to be the hydrophilic monomer and the remaining blocks are hydrophobic blocks dissimilar from one another.

Polymeric dispersants useful for dispersing the pigment particles can be selected from acrylics and styrene-acrylics. Styrene-acrylic polymeric dispersants especially useful in the present invention are copolymers of styrenic monomers and carboxylate monomers. Examples of such dispersants include copolymers of styrene or alphamethyl styrene and acrylic acid or methacrylic acid (such as the JONCRYL (BASF) or TRUDOT (Mead Westvaco) polymers) or styrene maleic anhydride and styrene maleic anhydride amic acid copolymers (such as SMA-1440, SMA-17352, SMA-1000, SMA-2000 (Sartomer Inc.)).

Acrylic polymeric dispersants useful in the present invention are typically formed from one or more acrylic monomer and one or more ionizable monomer, such as, for example carboxylated or sulfonated monomers. Acrylic polymeric dispersants are typically formed from one or more hydrophobic acrylate monomer including, for example, methylmethacrylate, ethylmethacrylate, butylmethacrylate, hexylmethacryate, octylmethacrylate and decylmethacrylate.

Other especially useful polymeric dispersants are those where the hydrophobic monomer is selected from benzyl methacrylate or acrylate, or from acrylic acid esters containing an aliphatic chain having twelve or more carbons and where the hydrophilic monomer is a carboxylated monomer. Examples of acrylic acid esters having twelve or more carbons include; lauryl acrylate, lauryl methacrylate, tridecyl acrylate, tridecyl methacrylate, tetradecyl acrylate, tetradecyl methacrylate, cetyl acrylate, iso-cetyl acrylate, stearyl methacrylate, iso-stearyl methacrylate, stearyl acrylate, stearyl methacrylate, decyltetradecyl acrylate, and decyltetradecyl methacrylate. Preferably the methacrylate or acrylate monomer is stearyl or lauryl methacrylate or acrylate. The hydrophobic portion of the polymer can be prepared from one or more of the hydrophobic monomers. Desirable carboxylated hydrophilic monomers are acrylic acid or methacrylic acid, or combinations thereof.

Typically, the weight average molecular weight of the polymeric dispersant has an upper limit such that it is less than 50,000 Daltons. Desirably the weight average molecular weight of the copolymer is less than 25,000 Daltons; more desirably it is less than 15,000 and most desirably less than 10,000 Daltons. The copolymer dispersants preferably have a weight average molecular weight lower limit of greater than 500 Daltons.

In one exemplary embodiment, the pigment particles are dispersed with a copolymer where the hydrophobic monomer is benzyl methacrylate and is present from 50 weight percent to 80 weight percent relative to the total weight of the polymeric dispersant and the hydrophilic monomer is methacrylic acid.

In a second embodiment, copolymer dispersants are employed which include a hydrophobic monomer having a carbon chain length of greater than or equal to 12 carbons present in an amount of at least 10% by weight of the total copolymer, and more desirably greater than 20% by weight, an optional additional hydrophobic monomer including an aromatic group and a hydrophilic monomer that is methacrylic acid. For example, the additional aromatic group containing monomer can be benzyl acrylate or benzyl methacrylate. An especially useful additional monomer is benzyl methacrylate.

The total amount of hydrophobic monomers, comprising the monomer having a chain with greater than or equal to 12 carbons and optionally, monomer containing an aromatic group, can be present in the polymer in an amount of 20 to 95% by weight of the total polymer. The hydrophobic aromatic-group containing monomer can be present in an amount from about 0 to 85% by weight of the total polymer, more typically from about 0 to 60%, and desirably from about 0 to 50%. A particularly useful embodiment of a polymeric dispersant for the pigment particles is a terpolymer of benzyl methacrylate, stearyl methacrylate and methacrylic acid. Particularly useful polymeric pigment dispersants are further described in U.S. Patent Application Publication Nos. 2006/0012654 and 2007/0043144, the disclosures of which are incorporated by reference herein.

Encapsulating type polymeric dispersants and polymeric dispersed pigments thereof can also be used in the present invention. Specific examples are described in U.S. Pat. Nos. 6,723,785, 6,852,777, and U.S. Patent Application Publication Nos. 2004/0132942, 2005/0020731, 2005/0009951, 2005/0075416, 2005/0124726, 2004/0077749, and 2005/0124728. Encapsulating type polymeric dispersants can be especially useful because of their high dispersion stability on keeping and low degree of interaction with ink components. Composite colorants particles having a colorants phase and a polymer phase are also useful in aqueous pigment-based printing fluids of the present invention. Composite colorants particles are formed by polymerizing monomers in the presence of pigments; see for example, U.S. Patent Application Publication Nos. 2003/0199614, 2003/0203988, or 2004/0127639. Microencapsulated-type pigment particles are also useful and consist of pigment particles coated with a resin film; see for example U.S. Pat. No. 6,074,467.

The pigment particles useful in the present invention can have any particle size that can be jetted through a print head. Preferably, the pigment particles have a volume weighted mean particle size of less than about 0.5 micron. The pigment dispersions useful in pigment-based printing fluid compositions employed in the present invention desirably have a median particle diameter of less than 200 nm and more desirably less than 150 nm. In a particularly useful embodiment, 90 percent of the weight of the pigment particles in the distribution have a diameter less than 150 nm and desirably less than 100 nm.

Self-dispersing pigments, i.e., pigments that are dispersible without the use of a separate dispersant or surfactant, useful for the practice of the present invention are those that have been subjected to a surface treatment such as oxidation/reduction, acid/base treatment, or functionalization through coupling chemistry. The surface treatment can render the surface of the pigment with anionic, cationic, or non-ionic groups. The preparation and use of covalently functionalized self-dispersed pigments suitable for inkjet printing are disclosed in U.S. Pat. Nos. 6,758,891, 6,660,075, 5,554,739, 5,707,432, 5,803,959, 5,922,118, 5,837,045, 6,494,943, 6,280,513, 6,503,311, 6,852,156 and 6,488,753; in published applications WO 96/18695, WO 96/18696, WO 96/18689, WO 99/51690, WO 00/05313, and WO 01/51566 EP 1,479,732. Examples of commercially available self-dispersing type pigments include CAB-O-JET 200, CAB-O-JET-250, CAB-O-JET-260, CAB-O-JET-270, and CAB-O-JET 300 (Cabot Specialty Chemicals, Inc.); BONJET CW-1, CW-2 and CW-3 (Orient Chemical Industries, Ltd.); and AQUA BLACK 162 and 001 (Tokai Carbon, Ltd.).

A wide variety of organic and inorganic pigments, alone or in combination with additional pigments or dyes, can be in the present invention. Pigments that can be used in the present invention include those disclosed in, for example, U.S. Pat. Nos. 5,026,427; 5,085,698; 5,141,556; 5,160,370; and 5,169,436. The exact choice of pigments will depend upon the specific application and performance requirements such as color reproduction and image stability. Dispersed pigment particles are typically present at from 1 to 10 wt % in the pigmented inkjet printing fluids of the present invention, preferably 1 to 6 wt %. Pigments suitable for use in the present invention include, but are not limited to, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black.

Typical examples of organic pigments that can be used include Color Index (C.I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C.I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C.I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; and C.I. Pigment Brown 1, 5, 22, 23, 25, 38, 41, 42.

Printing fluid compositions of the present invention can also preferably include a humectant in order to achieve reliable firing at high frequency with low velocity variability. Representative examples of humectants which can be employed in the present invention include: (1) triols, such as; glycerol, 1,2,6-hexanetriol, 2-ethyl-2-hydroxymethylpropane diol, trimethylolpropane, alkoxlated triols, alkoxylated pentaerythritols, saccharides, and sugar alcohols; and (2) diols, such as ethylene glycol, diethylene glycol, triethylene glycol, propylene glycol, polyalkylene glycols having four or more alkylene oxide groups, 1,3-propane diol, 1,2-butane diol, 1,3-butane diol, 1,4-butane diol, 1,2-pentane diol, 1,5-pentanediol, 1,2-hexanediol, 1,6-hexane diol, 2-methyl-2,4-pentanediol, 1,2-heptane diol, 1,7-hexane diol, 2-ethyl-1,3-hexane diol, 1,2-octane diol, 2,2,4-trimethyl-1,3-pentane diol, 1,8-octane diol; and thioglycol or a mixture thereof. Desirable humectants are polyhydric alcohols having three or more hydroxyl groups. A particularly useful humectant is glycerol.

Typical aqueous-based ink compositions for drop-on-demand thermal print head systems useful in the present invention can contain, e.g., 5-35 weight percent humectant(s), especially from 6-25% humectant, most desirably from about 7-20% humectant. Inks including humectants having the aforementioned viscosity and concentration ranges are ideal for maintaining ink viscosities in an acceptable range for high speed firing from a thermal inkjet print head with low variability in firing velocity. While higher levels can be typically preferred for use in drop-on-demand printers, the total humectant level of printing fluid compositions for CIJ printing is desirably 10% or less by weight, more preferably 8% or less by weight, and most preferably 6% or less by weight. A preferred range of humectant for CIJ printing fluids is from 0.5 to about 8% by weight, more preferably from 0.5 to about 6% by weight. The total humectant level of the ink is the sum of the individual sources of humectant ingredients, which can include humectant added directly during ink formulation, and for example humectant associated with a commercial biocide preparation as a supplemental ingredient, or with a commercial pigment dispersion preparation that can be present to prevent so-called "paint-flakes" of dried pigment cake forming around a bottle cap, as described in U.S. Patent Application Publication No. 2005/0075415 A1. More desirably, the total humectant level is from about 1% to less than 10%, in order to facilitate drying of the inkjet printing recording material in a high speed printer while simultaneously encouraging higher equilibrium moisture content in dried ink film on hardware for redispersion and clean-up by ink, or by start-up and shut-down fluids, or by a print head storage fluid.

The printing fluid compositions of the present invention can also nclude a water miscible co-solvent or penetrant. Representative examples of co-solvents used in the aqueous-based printing fluid compositions include: (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) lower mono- and di-alkyl ethers derived from the polyhydric alcohols; such as ethylene glycol monomethyl ether, ethylene glycol monobutyl ether, ethylene glycol monoethyl ether acetate, diethylene glycol monomethyl ether, and diethylene glycol monobutyl ether acetate; (3) nitrogen-containing compounds, such as urea, 2-pyrrolidinone, N-methyl-2-pyrrolidinone, imidazolidinone, and 1,3-dimethyl-2-imidazolidinone; and (4) sulfur-containing compounds, such as 2,2'-thiodiethanol, dimethyl sulfoxide, and tetramethylene sulfone. Typical aqueous-based printing fluid compositions of the present invention can contain 2-15 weight percent co-solvent(s).

The pH of the aqueous printing fluid compositions of the present invention can be adjusted by the addition of organic or inorganic acids or bases. Inorganic bases are preferred; however, small amounts of organic bases, such as triethanolamine, can be used to adjust the pH of the printing fluid. Useful printing fluids for drop-on-demand applications can have a preferred pH of from about 4 to 10, depending upon the type of pigment being used. Preferably, the pH of such printing fluid is from 6 to 9, more preferably from 7 to 9. The pH of the inkjet ink composition directed at CIJ is desirably adjusted from about 7 to about 12; more desirably, the pH is about 8 to 10. When the ink composition is used in hardware with nickel or nickel-plated apparatus components, an anti-corrosion inhibitor such as the sodium salt of 4- or 5-methyl-1-H-benzotriazole is desirably added and the pH adjusted to be from about 10 to about 11. When the ink composition is used with print heads with components fabricated from silicon that are in contact with the fluid, the ink composition pH is desirably adjusted to be from about 7 to about 9.5; more desirably, the pH ranges from about 7.5 to about 9. In order to reduce the risk of excessively protonating carboxylate anions associated with polymeric dispersants and anionic charge stabilized anti-abrasion polymers that might render the ink composition more susceptible to flocculation, pH levels lower than about 7 are desirably avoided. With hardware components fabricated from silicon in contact with the ink composition, pH levels higher than about 10 can induce significant rates of etch and corrosion that can impair the operation of the device over time. Typical inorganic acids include nitric, hydrochloric, phosphoric, and sulfuric acids. Typical organic acids include methanesulfonic, acetic, formic, and lactic acids. Typical inorganic bases include alkali metal hydroxides and carbonates. Typical organic bases include ammonia, triethanolamine, and tetramethylethlenediamine. Amine bases especially desirable in the application of the present invention to CIJ printing include 3-amino-1-propanol, N,N-dimethanolamine, N,N-dimethylethanolamine, N,N-diethylethanolamine, and triethanolamine. The well known Goods buffers can also be employed.

The inks of the present invention can contain surfactants added to adjust the static surface tension or dynamic surface tension of the ink to an appropriate level. The surfactants can be anionic, cationic, amphoteric, or nonionic and used at, e.g., levels of 0.01 to 5% of the ink composition. Defoaming agents including phosphate esters, polysiloxanes, or acetylenic diols can further optionally be used with the ink compositions directed at CIJ to reduce foam formation caused by the fluid agitation associated with drop catching and ink recirculation.

The pigment-based printing fluid compositions of the present invention can also contain a water-soluble acrylic polymer including carboxylic acid groups. The term "water-soluble" is defined herein as when the polymer is dissolved in water and when the polymer is at least partially neutralized with an inorganic monovalent base the resultant solution is visually clear. Acrylic polymers which can be employed in the present invention are exemplified by those disclosed in U.S. Pat. No. 6,866,379, which is incorporated herein in its entirety by reference. To avoid undesired viscosity increases, however, such water-soluble acrylic polymers are either not employed or employed at concentrations lower than that of the acrylic latex polymers.

The exact choice of ink components will depend upon the specific application and performance requirements of the print head from which they are to be jetted. Desirable viscosities are no greater than 10 cP, preferably in the range of 1.0 to 4.0 cP, and more preferably 1.0 to 3.0 cP. Printing fluid compositions defined by these desirable embodiments are capable of achieving high firing frequencies with low variability for a large number of firing events.

Surfactants can be added to adjust the surface tension of the printing fluid to an appropriate level. In a particular embodiment, relative dynamic and static surface tensions of various pigment based printing fluids and clear protective printing fluid of an ink set can be controlled as described in U.S. Patent Application Publication No. 2008/0207805, the disclosure of which is incorporated by reference herein, to control intercolor bleed between the inks The surfactants can be anionic, cationic, amphoteric, or nonionic and used at levels of 0.01 to 5% of the ink composition. Examples of suitable nonionic surfactants include, linear or secondary alcohol ethoxylates (such as the TERGITOL 15-S and TERGITOL TMN series available from Union Carbide and the BRIJ series from Uniquema), ethoxylated alkyl phenols (such as the TRITON series from Union Carbide), fluoro surfactants (such as the ZONYLS from DuPont; and the FLURADS from 3M), fatty acid ethoxylates, fatty amide ethoxylates, ethoxylated and propoxylated block copolymers (such as the PLURONIC and TETRONIC series from BASF, ethoxylated and propoxylated silicone based surfactants (such as the SILWET series from CK Witco), alkyl polyglycosides (such as the GLUCOPONS from Cognis), and acetylenic polyethylene oxide surfactants (such as the Surfynols from Air Products, Inc.).

Examples of anionic surfactants include carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, fatty acid taurates, and alkyl naphthalene sulfonates), phosphated (such as phosphated esters of alkyl and aryl alcohols, including the STRODEX series from Dexter Chemical), phosphonated and amine oxide surfactants, and anionic fluorinated surfactants. Examples of amphoteric surfactants include betaines, sultaines, and aminopropionates. Examples of cationic surfactants include quaternary ammonium compounds, cationic amine oxides, ethoxylated fatty amines, and imidazoline surfactants. Additional examples of the above surfactants are described in "McCutcheon's Emulsifiers and Detergents," 1995, North American Edition.

A biocide (0.01-1.0% by weight) can also be added to prevent unwanted microbial growth which can occur in the printing fluid over time. A preferred biocide for the printing fluids employed in the present invention is PROXEL GXL (Zeneca Colours Co.) at a concentration of 0.05-0.1% by weight or/and KORDEK (Rohm and Haas Co.) at a concentration of 0.05-0.1% by weight (based on 100% active ingredient). Additional additives which can optionally be present in an inkjet printing fluid composition include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers, and defoamers.

Inkjet printing systems useful in the present invention include a printer, at least one printing fluid as described above, and an image recording element, typically a sheet (herein also "media"), suitable for receiving printing fluid from an inkjet printer. The method of the present invention employs the inkjet printing system of the present invention to provide an image on media. Inkjet printing is a non-impact method for producing printed images by the deposition of printing fluid droplets in a pixel-by-pixel manner to an image-recording element in response to digital data signals. There are various methods that can be utilized to control the deposition of printing fluid droplets on the image-recording element to yield the desired printed image, as further discussed above.

The following examples illustrate, but do not limit, the utility of the present invention.

EXAMPLE 1

Synthesis of Acrylic Polymer Latexes AP-1 to AP-5 Used in Ink Examples

Acrylic polymers are made by emulsion polymerization using RHODACAL A246L as surfactant and potassium persulfate as initiator. Acrylic polymer dispersions typically range in size from 30 to 150 nm, and weight average molecular weights of approx 10,000 to 1,000,000.

Acrylic polymer AP-1: a terpolymer of Ethylmethacrylate, Methacrylic acid, and Di(ethylene glycol)methyl ether methacrylate having an acid number of about 65. Polymer is neutralized with potassium hydroxide. Degree of neutralization is 25%.

Acrylic polymer AP-2: a terpolymer of Ethylmethacrylate, Methacrylic acid, and poly(ethylene glycol) methyl ether methacrylate (4 glycol repeat units) having an acid number of about 65. Polymer is neutralized with potassium hydroxide. Degree of neutralization is 25%.

Acrylic polymer AP-3: a terpolymer of Ethylmethacrylate, Methacrylic acid, and Poly(ethylene glycol)methyl ether methacrylate (8 glycol repeat units) having an acid number of about 65. Polymer is neutralized with potassium hydroxide. Degree of neutralization is 25%.

Acrylic polymer AP-4: a terpolymer of Ethylmethacrylate, Methacrylic acid, and poly(ethylene glycol)methyl ether methacrylate (22 glycol repeat units) having an acid number of about 65. Polymer is neutralized with potassium hydroxide. Degree of neutralization is 25%.

Acrylic polymer AP-5: a terpolymer of Ethylmethacrylate, Methacrylic acid, and poly(ethylene glycol)methyl ether methacrylate (45 glycol repeat units) having an acid number of about 65. Polymer is neutralized with potassium hydroxide. Degree of neutralization is 25%.

EXAMPLE 2

Typical Ink Preparation

A pigment black NIPEX 180 pigment based inkjet ink formulation INK-1 containing acrylic polymer latex AP-1 and was prepared as follows. A common dispersion was prepared and the following were added in the order listed: 142.68 g of distilled water, 94.50 g glycerol, 2.10 g of a 50 wt % solution of corrosion inhibitor COBRATEC TT-50S, 2.10 g of a 17 wt % solution of biocide PROXEL GXL, 1.26 g of the nonionic surfactant SURFYNOL 440, 908.65 g of a black pigment dispersion PB-I containing 10.4 wt % NIPEX 180, and 24.71 g of a 17.0 wt % solution of Direct Black 19 (Sensient SF). To 140.0 g of the above common the appropriate amount of acrylic latex dispersion was added to bring the concentration of the latex to 10 wt % of ink. After which 0.20 g of defoamer SURFYNOL DF-110L was added. The resulting 250 mls of ink were stirred for 16 hrs and filtered through a 1.0 um GF prefilter and a 1.2 um VERSAPOR filter. Inks INK-2 through INK-5 were similarly prepared, with acrylic polymer latex indicated in Table 1 below.

EXAMPLE 3

Evaluation of Ink Performance

Recirculation stability was evaluated by running 125 mls of each ink through a system capable of in-line monitoring of the demobilization of the ink. This system included a small reservoir to contain the ink sample, a gear pump, and a filter holder, all connected in a recirculation loop. Reservoir volume was 125 mls. The gear pump used was a MICROPUMP Model 180. The filter used was a 3.0 um VERSAPOR disk filter. The recirculation flow rate was 1 L/minute with a pressure approximately 20 psi at the start. To simulate continuous printing process, it is desirable to have ink keep recirculating through the gear pump with minimal change in the recirculation pressure. The measured pressure change after 2 hours is shown in Table 1.

TABLE 1

| Ink Sample | Acrylic | Wt % Acrylic | Glycol Repeat Units | Pressure Change in 2 hrs (psi) |
|---|---|---|---|---|
| INK-1 | AP-1 | 10.0 | 0 | ** |
| INK-2 | AP-2 | 10.0 | 4 | 17.00 |
| INK-3 | AP-3 | 10.0 | 8 | 10.66 |
| INK-4 | AP-4 | 10.0 | 22 | 7.33 |
| INK-5 | AP-5 | 10.0 | 45 | 4.91 |

** Plugged filter in less than 1.5 hrs

Comparative ink INK-1 exhibited filter plugging in less than 1.5 hours, while the inks of the present invention (INK-2 through INK-5) demonstrated significant reduction in pressure change. Greater improvement in stability was obtained as the number of repeating glycol units in the acrylic polymer was increased.

The present invention has been described in detail with particular reference to certain preferred embodiments thereof, but it will be understood that variations and modifications can be effected within the spirit and scope of the invention.

PARTS LIST 20 continuous printing system
22 image source
24 image processing unit
26 mechanism control circuit
28 drop forming mechanism
30 print head
32 recording medium
34 recording medium transport
36 recording medium transport control system
38 micro-controller
40 ink reservoir
42 ink catcher
44 ink recycling unit
46 ink pressure regulator
47 ink channel

The invention claimed is:

1. A method for inkjet printing, comprising:
providing a printing fluid applicator and a recirculating printing fluid supply comprising an inkjet printing fluid, and
applying the inkjet printing fluid to a substrate from the recirculating printing fluid supply using the printing fluid applicator wherein either: (a) non-printed inkjet printing fluid is maintained in a constant state of agitation by recirculation, or (b) nonprinting drops of the inkjet printing fluid are returned to the recirculating printing fluid supply,
wherein the inkjet printing fluid comprises water, colorant comprising dispersed pigment particles, and an acrylic latex polymer that includes at least four repeating units of alkylene oxide groups,
wherein the acrylic latex polymer has a weight average molecular weight of from about 10,000 to 2,000,000 Daltons.

2. The method of claim 1, wherein the acrylic latex polymer in the inkjet printing fluid includes at least four repeating units of ethylene oxide groups.

3. The method of claims 1, wherein the acrylic latex polymer in the inkjet printing fluid includes at least eight repeating units of ethylene oxide groups.

4. The method of claim 1, wherein the acrylic latex polymer in the inkjet printing fluid includes at least 22 repeating units of ethylene oxide groups.

5. The method of claim 1, wherein the acrylic latex polymer in the inkjet printing fluid includes at least 45 repeating units of ethylene oxide groups.

6. The method of claim 1, wherein the acrylic latex polymer in the inkjet printing fluid has a weight average molecular weight of from about 40,000 to 100,000 Daltons.

7. The method of claim 1, wherein the dispersed pigment particles in the inkjet printing fluid are dispersed either with a polymeric dispersant or with a surfactant, or are self-dispersed without the need for a separate dispersant.

8. The method of claim 1, wherein the dispersed pigment particles are present in the inkjet printing fluid at a weight concentration of from 1 to 10% and the acrylic latex polymer is present in the inkjet printing fluid at a weight concentration of from 2 to 20%.

9. The method of claim 1, wherein the weight concentration of the acrylic latex polymer in the inkjet printing fluid is greater than the weight concentration of the dispersed pigment particles.

10. The method of claim 1, wherein the dispersed pigment particles are present in the inkjet printing fluid at a weight concentration of from 1 to 10 weight %.

11. The method of claim 1, wherein the inkjet printing fluid further comprises at most 10 weight % of humectants.

12. The method of claim 1, wherein the acrylic latex polymer is present in the inkjet printing fluid at a weight concentration of from 1 to 20%.

13. The method of claim 1, wherein the acrylic latex polymer is present in the inkjet printing fluid as dispersed particles with less than 20 weight % of the acrylic latex polymer as free solution polymer.

14. The method of claim 1, wherein the acrylic latex polymer is present in the inkjet printing fluid as dispersed particles with less than 10 weight % of the acrylic latex polymer as free solution polymer.

15. The method of claims 1, wherein the acrylic latex polymer is present in the inkjet printing fluid as dispersed particles with less than 4 weight % of the acrylic latex polymer as free solution polymer.

16. The method of claim 1, wherein the acrylic latex polymer in the inkjet printing fluid comprises from 0.5 weight % to 15 weight % of acid monomers, based on the total monomers used to form the latex polymer.

* * * * *